No Printed Specification Available
6844½X
B. M. Smith.
Screw Propeller.
No.
Patented Nov. 20, 1831.
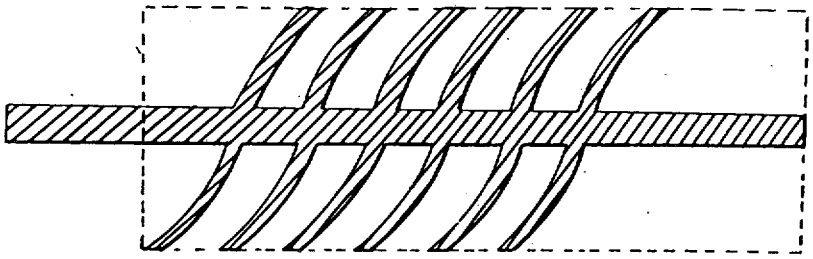
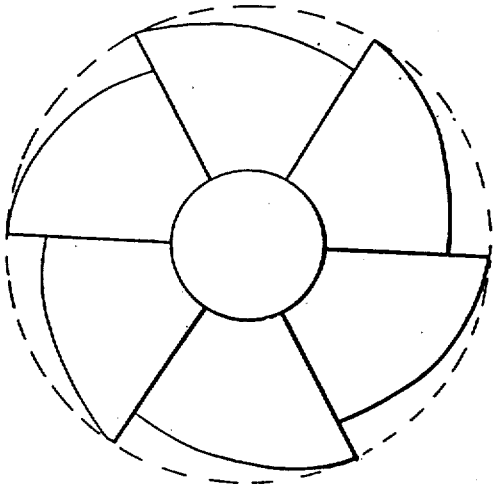
N. PETERS, PHOTO-LITHOGRAPHER, WASHINGTON, D. C.

6844½ Nov 20, 1831

Benjamin M. Smith
Letters Patent Dated. November 20. 1831.

The schedule referred to in these Letters Patent, & making part of the same containing a descrip-tion in the words of the said Benjamin M. Smith, himself of his improvement being a new & useful mode of propelling Boats in the water, by the application of Sculling Wheels or screw propelling wheels.

To all to whom these Presents shall come:
Be it known that I Benjamin M. Smith, of Rochester, County of Monroe & State of New York, have invented a new & useful mode of propelling boats in the water by the application of sculling wheels, or screw propelling wheels to the boats, & that the following is a full & exact description of the mode in which the boats are propelled, as invented by me.

I make wheels (to the discovery of which I lay no claim and) which are thus described - any number of paddles in shape resembling an open fan (as may be seen by the annexed drawing) & of any length & width are fasten d at the tapered end to a centre block or hub. These paddles are set oblique from the centre block, at any angle wished & are set regular so that the upper extreme points of the paddles would all fall in the circumference of the same circular plane & all the lower or opposite extreme points of the paddles would also fall in the circumference of a circular plane, parallel to the first named -
The distance between the two supposed circular planes, would be according to the obliquity & width of the paddles & the outer ends of the paddles would coincide with the threads of a screw. The whole wheels are best constructed of iron, but may be of any hard suitable material & when completed are like the wheel usually denominated a smoke jack.

Two of these wheels may be fastened at the stern or bow of the boat placed perpendicular or horizontal, with a shaft running from the centre of the wheel, & may be worked by horses, steam or any other power.

The wheels work best when they revolve contrary ways from each other, so as to throw in the water towards each other, and prevent the washing of canal banks. Any number of wheels may be applied to a boat.

What I claim as new & as my own invention is the application of wheels of this description to propelling boats in the manner described, they never before having been used for that purpose.

Witness
Moses Chapin
Hiram Leonard

Benjamin M. Smith (Received and Recorded anew August 11 1844)

535 words

Drawing

Exd
JHB